United States Patent Office 3,359,171
Patented Dec. 19, 1967

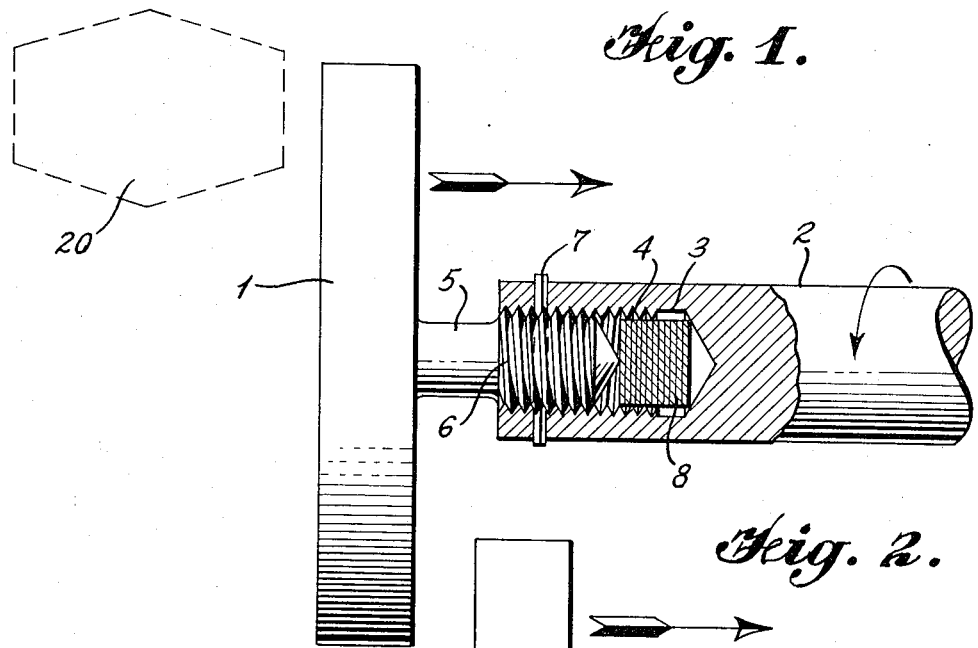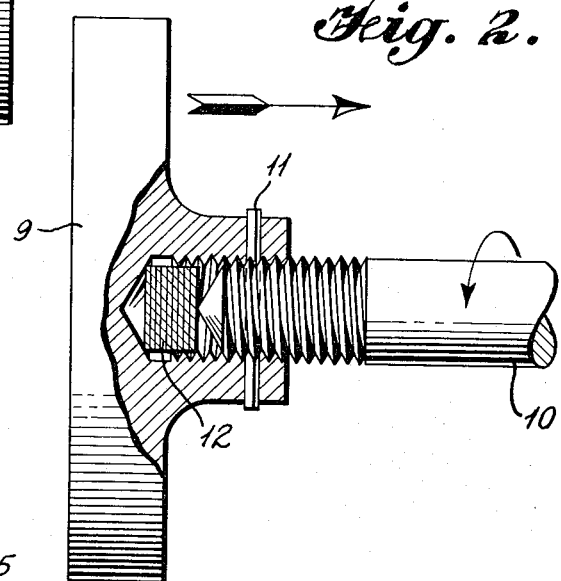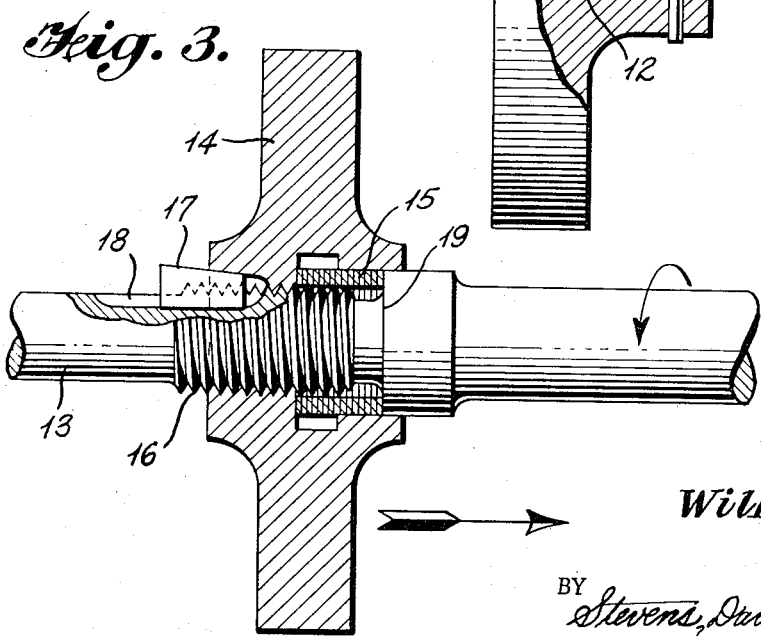

3,359,171
PULSED NUCLEAR REACTORS
Wilhelm Hanke, Bobbiate, Varese, Italy, assignor to European Atomic Energy Community (Euratom), Brussels, Belgium
Filed Feb. 10, 1966, Ser. No. 526,450
Claims priority, application Germany, Feb. 15, 1965, E 28,695
5 Claims. (Cl. 176—33)

ABSTRACT OF THE DISCLOSURE

A rotating apparatus for pulsing the reactivity of a nuclear reactor including a disk and a driving shaft coupled thereto by a screw connection having its threads coaxial with the axis of disk rotation and a frangible driving member locking the disk and drive shaft together such that sudden stoppage of the shaft fractures the frangible member permitting the disk to run on the threads in a direction away from the reactor, and a deformable member positioned between the disk and the shaft so as to resist said relative disk movement.

The invention relates to a pulsed fast nuclear reactor. The reactivity is pulsed by means of a disc which rotates before a neutron exit window of the reactor and which has localised at the periphery a means to increase the reactivity, e.g. a piece of nuclear fuel or a reflector. As such means passes the neutron exit window the reactor temporarily becomes supercritical, i.e. the required high-energy neutron pulse is obtained.

With this plant there is the risk that the driveshaft or other drive means for the disc may suddenly become locked, e.g. as a result of seizure or breakage of a bearing. The rotary kinetic energy of the disc is usually high and in such cases therefore the driveshaft will either shear off or else the disc will break. Such an accident may be avoided for safety reasons.

The invention relates to a safety connection between the disc and the driveshaft, such connection being so designed that in the event of the driveshaft locking there is no shearing of the shaft or breakage of the disc; instead, in a preferred form of the invention the disc is brought out of the pulsation position and hence rendered inoperative to increase the reactivity of the reactor.

The invention provides a pulsed nuclear reactor of the kind in which the reactivity is pulsed by a disc which is rotated before a neutron exit window of the reactor and which carries localised means for increasing the reactivity as it passes in front of the window characterised by a screw connection between the disc and driving means therefor, the screwthreads being coaxial with the axis of rotation and a frangible driving connection between the disc and the drive means arranged, in the event of a sudden stoppage of the drive means to fracture under the momentum of the disc and to permit the disc to continue rotation by running along the screw threads.

Preferably the hand of the thread is such that as the disc runs along the threads it moves away from the window. The effect of this type of connection is that in the event of the driveshaft or other driving means locking the disc continues to run and shears the frangible device and travels outwards away from the reactor along the screw thread. In these conditions the disc may be suitably braked and stopped, i.e. the kinetic energy is destroyed. In the meantime the reactor can be shut down (scram). To brake the disc, for example, the screwthread may be coarse and/or the disc can work against deformable material as it moves out of position.

Three specific embodiments of the invention are shown in longitudinal section in the accompanying diagrammatic drawings wherein:

FIGURE 1 shows a pulsation disc with a spigot or stub-shaft which is screwed into the blind end of an associated driveshaft.

FIGURE 2 shows a pulsation disc with a hub formed with a socket, into which the end of an associated driveshaft is screwed, and FIGURE 3 shows a pulsation disc with a hub having a throughway screwed on to a driveshaft.

FIGURE 1 shows the pulsation disc 1, the driveshaft 2, an end bore 3 in the driveshaft, an internal screwthread 4 in the bore, the pulsation disc stub-shaft 5, an external screwthread 6 on the shaft 5 and mating with the internal screwthread, a shear pin 7, and a packing 8 of deformable material. The shaft end is conical; the screwthreads are machined to provide an accurate fit but this is not essential.

Similarly, in FIGURE 2, reference 9 denotes the pulsation disc, 10 the driveshaft—both screwthreaded—11 the shear pin and 12 the deformable material.

FIGURE 3 shows a driveshaft 13, pulsation disc 14, annular deformable material 15, screwthreading 16, and shear element 17. The latter is a spring key in a longitudinal keyway 18. The deformable material bears against a collar or shoulder 19 of the driveshaft and a collar or step within the disc.

Discs or rings of soft copper are used as deformable material. The nuclear reactor with its neutron exit window is situated at the left of the pulsation disc (see reference 20 in FIGURE 1 for the reactor core). If the driveshaft becomes locked, the disc moves to the right in the drawing (i.e. away from the window in the reactor) after shearing the pin 7 or 11 or the key 17. The braking effect in the screwthread can also be produced, for example, by having a variable pitch or variable profiling of the screwthreading, on the driveshaft or on the pulsation disc.

I claim:
1. In a pulsed nuclear reactor of the kind in which the reactivity is pulsed by a rotating disk which is rotated before a neutron exit window of the reactor and which carries localized means for increasing the reactivity of the reactor as it passes in front of the window, the improvement comprising a disk and a driving shaft coupled to said disk by a screw connection having the screwthreads coaxial with the axis of disk rotation and a frangible driving member coupled to said disk and to said driving shaft for locking the same together and which fractures under the momentum of the disk relative the shaft to permit the disk to continue rotation by running along the screwthreads.

2. In a reactor according to claim 1 in which the hand of the screwthread is such that following a sudden stoppage of the driving shaft and a fracture of the frangible member, the disk running on the threads moves away from the reactor.

3. In a reactor according to claim 1 further comprising deformable means arranged between the disk and shaft to be deformed by relative movement of the disk along the threads for resisting such relative disk movement.

4. In a reactor according to claim 3 in which deformable means comprises an annulus around the screwthreads and arranged to be compressed between collars on the disk and the shaft.

5. In a reactor according to claim 3 in which one of said disk and shaft together with said screw connection form a blind socket and said deformable means comprises a cylindrical member inserted at the bottom of the blind socket.

References Cited

UNITED STATES PATENTS

| | | | |
|---|---|---|---|
| 2,361,266 | 10/1944 | Miner et al. | 64—28 |
| 2,955,443 | 10/1960 | Fulop | 64—28 |
| 3,004,411 | 10/1961 | Bugel | 64—28 |
| 3,220,218 | 11/1965 | Rio et al. | 64—28 |

FOREIGN PATENTS 1,184,872  1/1965  Germany.

OTHER REFERENCES

Soviet Journal of Atomic Energy, vol. 5, No. 6 December 1958, pp. 1533–1534 (Zubarev).

CARL D. QUARFORTH, *Primary Examiner.*

L. DEWAYNE RUTLEDGE, *Examiner.*

H. E. BEHREND, *Assistant Examiner.*